United States Patent
Matamoros

(10) Patent No.: US 11,799,299 B2
(45) Date of Patent: Oct. 24, 2023

(54) DG INTENTIONAL ISLANDING USING PADMOUNT TRANSFORMER INTERRUPTERS

(71) Applicant: S&C Electric Company, Chicago, IL (US)

(72) Inventor: Joseph Matamoros, Chicago, IL (US)

(73) Assignee: S&C Electric Company, Chicago, IL (US)

( * ) Notice: Subject to any disclaimer, the term of this patent is extended or adjusted under 35 U.S.C. 154(b) by 250 days.

(21) Appl. No.: 17/524,148

(22) Filed: Nov. 11, 2021

(65) Prior Publication Data
US 2022/0158456 A1 May 19, 2022

Related U.S. Application Data

(60) Provisional application No. 63/115,821, filed on Nov. 19, 2020.

(51) Int. Cl.
*H02J 3/38* (2006.01)
*H02H 7/26* (2006.01)

(52) U.S. Cl.
CPC .............. *H02J 3/388* (2020.01); *H02J 3/381* (2013.01); *H02H 7/26* (2013.01)

(58) Field of Classification Search
None
See application file for complete search history.

(56) References Cited

U.S. PATENT DOCUMENTS

| | | | |
|---|---|---|---|
| 2014/0200722 A1* | 7/2014 | Bhavaraju | H02J 3/388 700/286 |
| 2016/0197476 A1* | 7/2016 | Stewart | H02J 3/18 307/24 |
| 2019/0190274 A1* | 6/2019 | Fazeli | H02J 7/35 |

\* cited by examiner

*Primary Examiner* — Jared Fureman
*Assistant Examiner* — Joel Barnett

(57) ABSTRACT

A system and method for allowing islanding in an underground power distribution network when power is lost to the network. The network includes transformers having source side and load side switching devices and servicing a transformer section. The method includes detecting loss of voltage to the network, opening the source side and the load side switching devices in all of the transformers and allowing distributed power generation sources in the sections serviced by the transformers to provide power to the section. The method also includes closing one or both of the source side switching device and the load side switching device of a transformer that services a section that has power generation sources providing excess power, and closing a source side switching device or a load side switching device in an adjacent transformer to the transformer section providing excess power to provide power to the adjacent section.

20 Claims, 4 Drawing Sheets

DG INTENTIONAL ISLANDING USING PADMOUNT TRANSFORMER INTERRUPTERS

CROSS-REFERENCE TO RELATED APPLICATION

This application claims the benefit of priority from the U.S. Provisional Application No. 63/115,821, filed on Nov. 19, 2020, the disclosure of which is hereby expressly incorporated herein by reference for all purposes.

BACKGROUND

Field

The present disclosure relates generally to a system and method for allowing islanding in an underground power distribution network when power is lost to the network and, more particularly, to a system and method for allowing islanding in an underground power distribution network when power is lost to the network by systematically operating switches at adjacent transformer sections.

Discussion of the Related Art

An electrical power distribution network, often referred to as an electrical grid, typically includes a number of power generation plants each having a number of power generators, such as gas turbines, nuclear reactors, coal-fired generators, hydro-electric dams, etc. The power plants provide power at a variety of medium voltages that are then stepped up by transformers to a high voltage AC signal to be connected to high voltage transmission lines that deliver electrical power to a number of substations typically located within a community, where the voltage is stepped down to a medium voltage for distribution. The substations provide the medium voltage power to a number of three-phase feeders including three single-phase feeder lines that carry the same current, but are 120° apart in phase. A number of three-phase and single phase lateral lines are tapped off of the feeder that provide the medium voltage to various distribution transformers, where the voltage is stepped down to a low voltage and is provided to a number of loads, such as homes, businesses, etc.

Some power distribution networks may employ a number of underground single-phase lateral circuits that feed residential and commercial customers. Often times these circuits are configured in a loop and fed from power sources at both ends, where an open circuit location, typically at a transformer, is used in the circuit to isolate the two power sources. These residential loop circuits sometimes include homes or businesses that have power generation capabilities, for example, through generators, photovoltaic cells, wind turbines, battery modules, etc., known generally as distributed power generation, where self-powered individual homes, groups of homes or businesses that are not connected to the grid is often referred to as islanding. The power service provider or utility generally requires that their customers that have distributed power generation capability agree not to inject power onto the circuit from their source, known generally as non-export tariffs. This is important because if a utility worker is dispatched to the loop circuit for service or repair, that person may not know that power is being injected onto the circuit by the distributed power sources, thus creating a possible safety issue. Exporting power across a transformer causes an increase in voltage experienced by other customers being serviced by the same transformer, which can result in voltage that exceeds the maximum voltage that the utility is required to regulate. Therefore, certain equipment and schemes are often employed by utilities to prevent islanding of distributed power generation and for enforcing non-export tariffs.

SUMMARY

The following discussion discloses and describes a system and method for allowing islanding in an underground power distribution network when power is lost to the network. The network includes a power line, a plurality of transformers electrically coupled to and positioned along the power line, where each transformer services a section of the network having loads and includes a source side switching device and a load side switching device, and where source power is provided to both ends of the power line and one of the switching devices is a normally open switching device. The method includes detecting loss of voltage to the network, opening the source side and load side switching devices in all of the transformers and allowing distributed power generation sources in the sections serviced by the transformers to provide power to the section. The method also includes closing one or both of the source side switching device and the load side switching device of a transformer that services a section that has power generation sources providing excess power, and closing a source side switching device or a load side switching device in an adjacent transformer to the transformer section providing excess power to provide power to the adjacent section.

Additional features of the disclosure will become apparent from the following description and appended claims, taken in conjunction with the accompanying drawings.

DETAILED DESCRIPTION OF THE EMBODIMENTS

The following discussion of the embodiments of the disclosure directed to a system and method for allowing islanding in an underground power distribution network when power is lost to the network is merely exemplary in nature, and is in no way intended to limit the invention or its applications or uses. For example, as mentioned, the system and method have particular application for use in a residential loop circuit. However, the system and method may have other applications.

Figure 1:
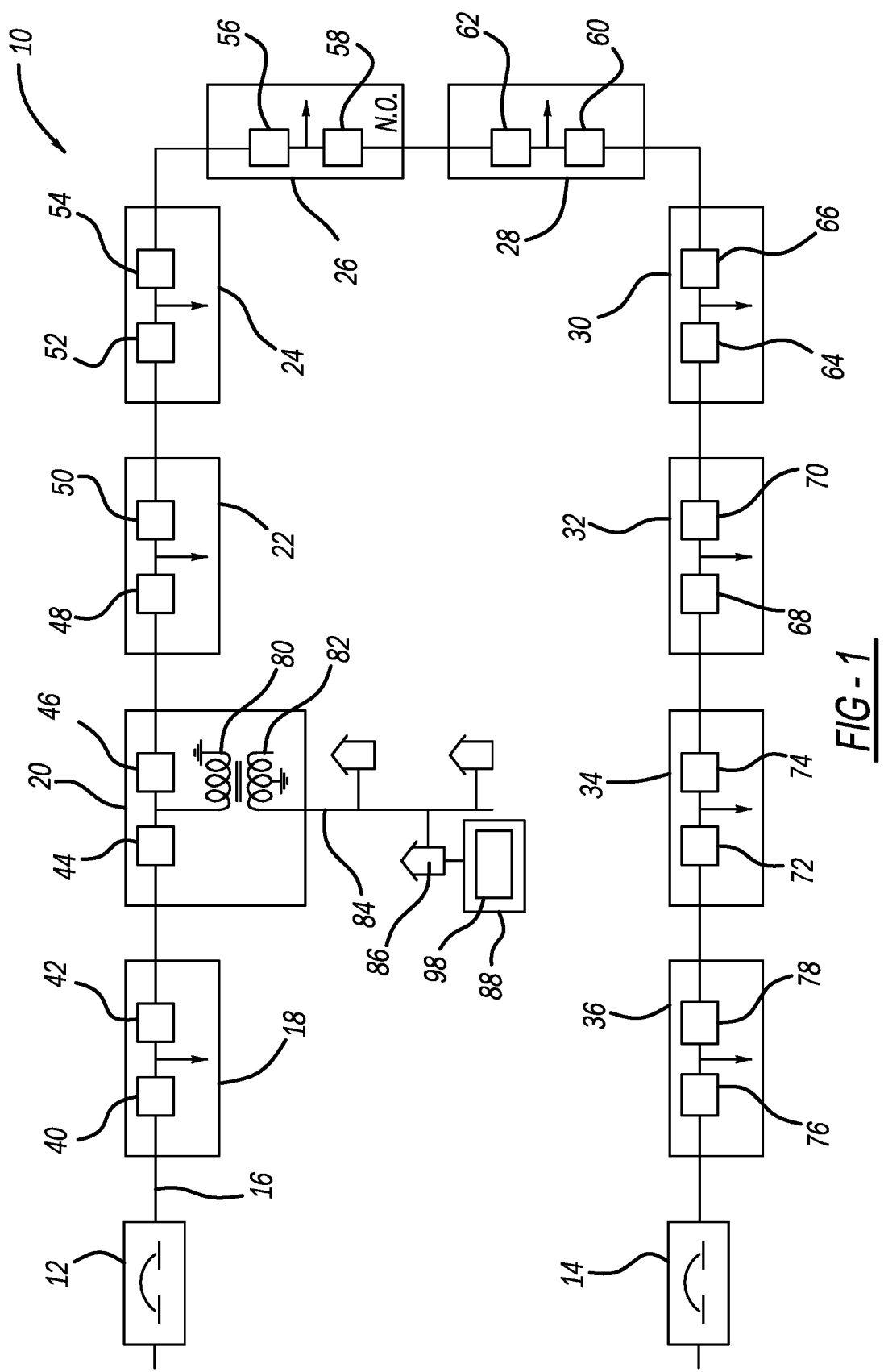
FIG. 1 is a simplified schematic diagram of a residential power distribution network including transformers having a pair of switching devices.

FIG. 1 is a simplified schematic diagram of an underground power distribution network 10 that is fed power from both ends. The network 10 includes, for example, two single-phase, self-powered, magnetically actuated reclosers 12 and 14 connected to the same or different feeders (not shown), or other source of power, at the head ends of the network 10, an underground distribution power line 16 and ten transformers 18, 20, 22, 24, 26, 28, 30, 32, 34 and 36 coupled along the line 16. Each transformer 18, 20, 22, 24, 26, 28, 30, 32, 34 and 36 includes a source side towards the source of power and a load side towards a normally open point (58 below) in the line 16. The transformer 18 includes source side and load side switching devices 40 and 42, respectively, the transformer 20 includes source side and load side switching devices 44 and 46, respectively, the transformer 22 includes source side and load side switching devices 48 and 50, respectively, the transformer 24 includes source side and load side switching devices 52 and 54, respectively, the transformer 26 includes source side and load side switching devices 56 and 58, respectively, the transformer 28 includes source side and load side switching devices 60 and 62, respectively, the transformer 30 includes source side and load side switching devices 64 and 66, respectively, the transformer 32 includes source side and load side switching devices 68 and 70, respectively, the transformer 34 includes source side and load side switching devices 72 and 74, respectively, and the transformer 36 includes source side and load side switching devices 76 and 78, respectively. The switching device 58 is normally open to provide electrical isolation between the source ends of the network 10.

The switching devices 40-78 can be any switching device suitable for the purposes discussed herein. The switching devices 40-78 can operate as fault interrupting devices or as sectionalizers. As used herein, sectionalizers detect overcurrent, but do not provide fault interrupting or reclosing, increase a count each time they detect loss of voltage during a fault clearing operation, and lock open if their count has reached a predetermined value and no current is flowing through the device in response to receiving a message.

The transformer 20 is shown with a primary coil 80 electrically coupled to the line 16 between the switching devices 44 and 46, a secondary coil 82 electrically coupled to the primary coil 80 and a service conductor 84 electrically coupled to the secondary coil 82 and providing power to a number loads 86, i.e., houses, where the other transformers 18 and 22-36 would be similarly configured with these same elements. One or more of the loads 86 may have its own power source 88, such as a generator, photovoltaic cells, a wind turbine, battery modules, etc., where the power source 88 would include an inverter 98 for converting DC to AC in a manner well understood by those skilled in the art. Exporting power occurs when the instantaneous distributed power generated at the power source 88 exceeds the instantaneous power required by the load 86.

Figure 2:
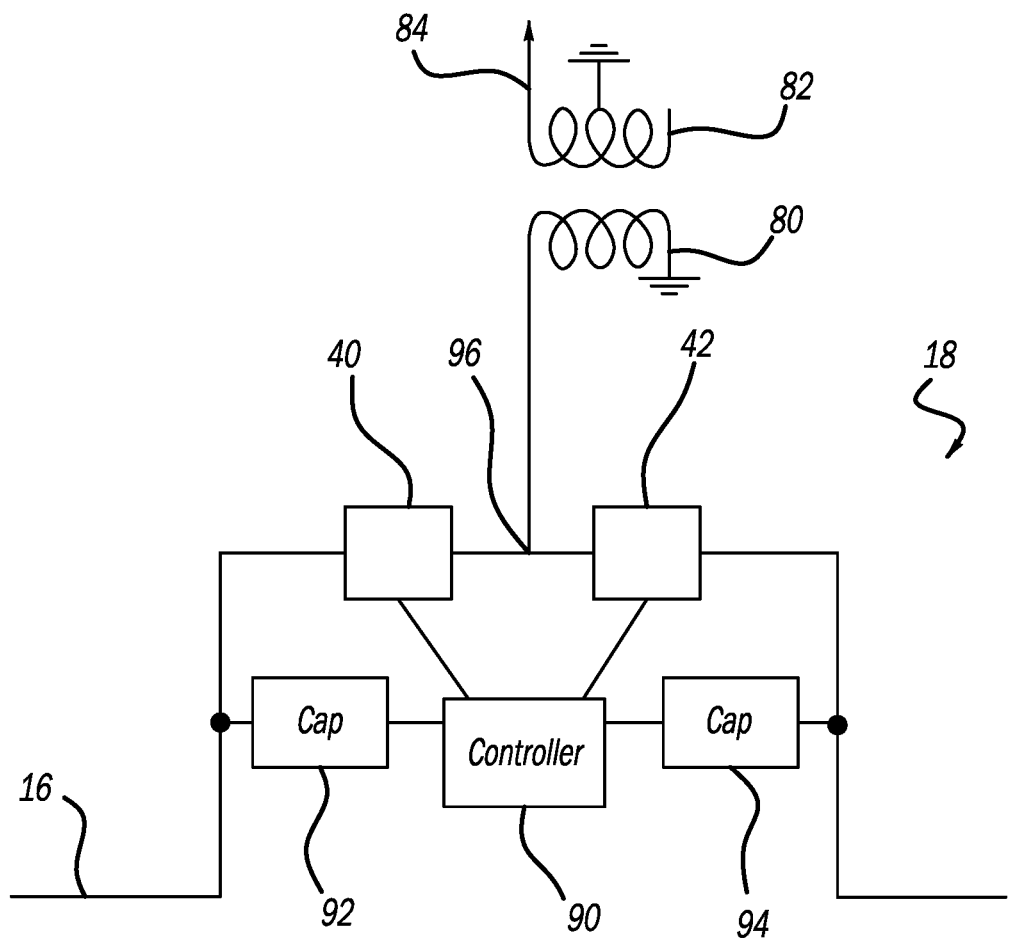
FIG. 2 is a schematic block diagram of one of the transformers in the network shown in FIG. 1.

FIG. 2 is a simple schematic block diagram of the transformer 18 with the understanding that the other transformers 20, 22, 24, 26, 28, 30, 32, 34 and 36 are the same or similar. The devices 40 and 42 share a common control unit 90 and one or more capacitors 92 are coupled between the line 16 and the control unit 90 on the source side and one or more capacitors 94 are coupled between the line 16 and the control unit 90 on the load side for measuring voltage on the source and load sides of the transformer 18. Particularly, the capacitors 92 measure voltage on the source side of the transformer 18, the capacitors 94 measure voltage on the load side of the transformer 18 and the control unit 90 measures voltage on a transformer bus 96 between the switching devices 40 and 42. The capacitors 92 would be physically located within the device 40 and the capacitors 94 would be physically located within the device 42.

Figure 3:
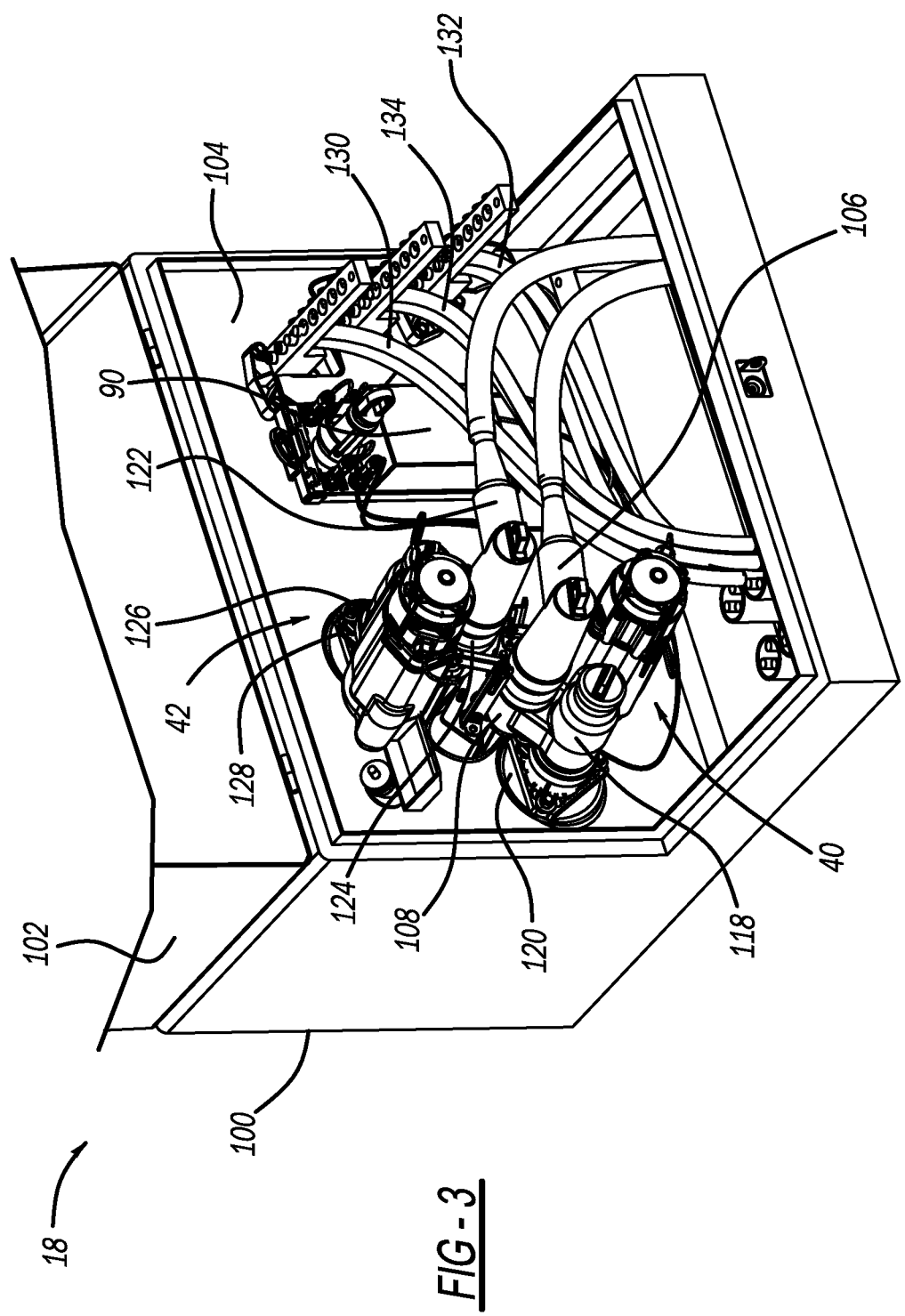
FIG. 3 is an isometric view of one of the transformers in the network shown in FIG. 1.

FIG. 3 is an isometric view of the transformer 18, which is the type that is mounted on a pad (not shown) with the understanding that the transformers 20, 22, 24, 26, 28, 30, 32, 34 and 36 are the same or similar. It is noted that the configuration of the transformer 18 is merely for illustrative purposes in that other configurations would be applicable consistent with the discussion herein. The transformer 18 includes an enclosure 100 that houses the coils 80 and 82 and other electrical components (not shown) of the transformer 18. A cover 102 of the enclosure 100 is shown in an open position to expose a panel 104 in the enclosure 100. An elbow connector 106 is connected to the line 16 and a load-break interface 108 of the switching device 40. A transformer interface 118 of the switching device 40 is connected to a connector bushing 120 that extends through the panel 104 and is coupled to the primary coil 80 to connect the line 16 to the primary coil 80 through the device 40 on the source side of the transformer 18. Likewise, an elbow connector 122 is connected to the line 16 and a load-break interface 124 of the switching device 42. A transformer interface 126 of the switching device 42 is connected to a connector bushing 128 that extends through the panel 104 and is coupled to the primary coil 80 to connect the line 16 to the primary coil 80 through the device 42 on the load side of the transformer 18. A number of positive and negative 120 V lines 130 and 132 and a neutral line 134 are connected to the secondary coil 82, extend from the enclosure 100 and provide power along the service conductor 84, where the number of the lines 130 and 132 depends on the number and type of the loads 86 being serviced by the transformer 18.

Figure 4:
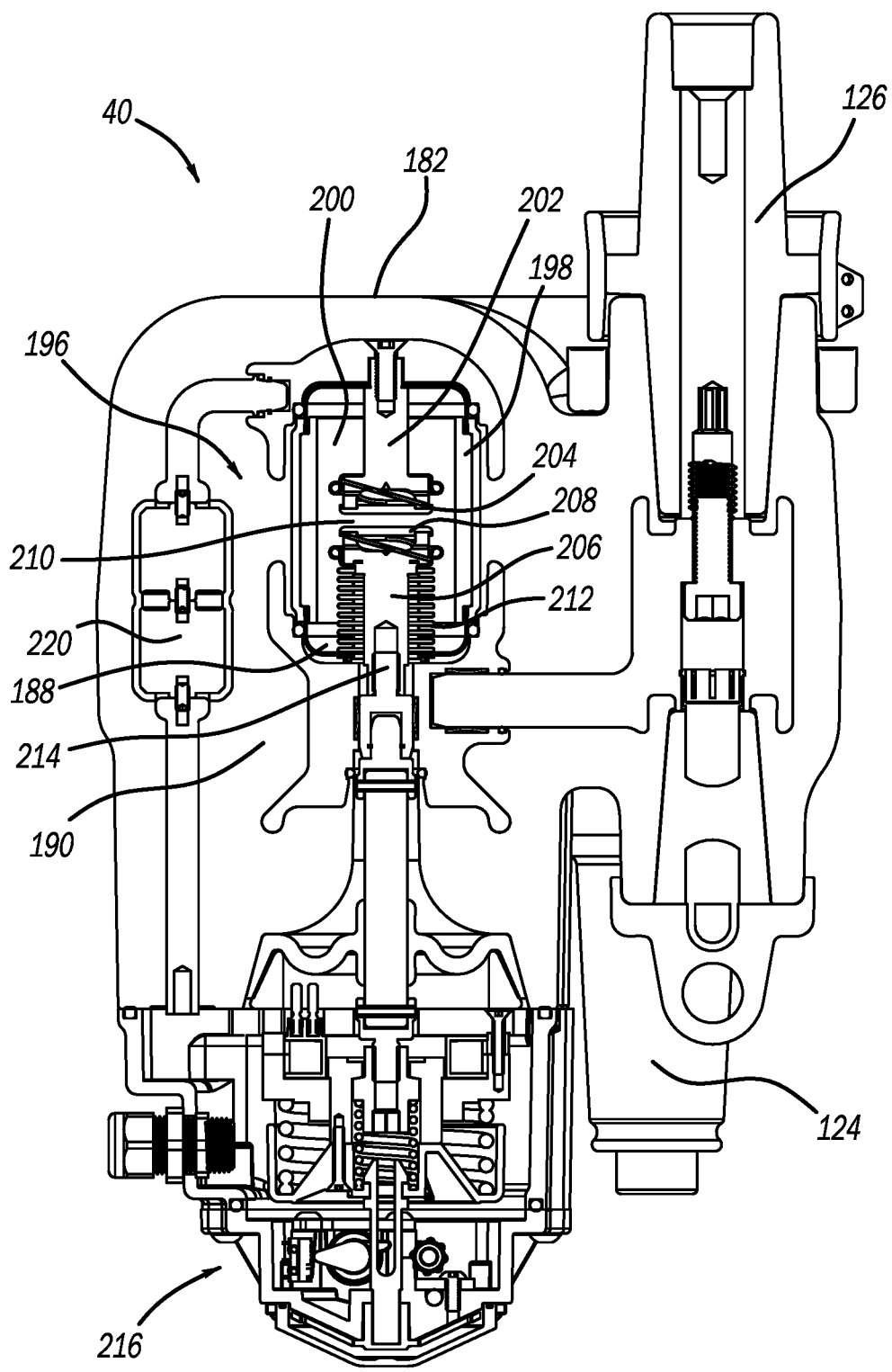
FIG. 4 is a cross-sectional type view of a switching device used in the transformer shown in FIG. 3.

FIG. 4 is a cross-sectional view of the switching device 40 showing one non-limiting example merely for illustrative purposes. The device 40 includes an outer enclosure 182, the transformer interface 126 and the load-break connector interface 124. The components within the enclosure 182 are encapsulated within an insulating medium 190, such as an epoxy, where many of the components are conductors operating at the medium voltage potential. A Rogowski coil 188 measures current flow through the switching device 40. The switching device 40 includes a vacuum interrupter 196 having a vacuum enclosure 198 defining a vacuum chamber 200, an upper fixed terminal 202 extending through the enclosure 198 and into the chamber 200 and having a contact 204 and a lower movable terminal 206 extending through the enclosure 198 and into the chamber 200 and having a contact 208, where a gap 210 is provided between the contacts 204 and 208 when the vacuum interrupter 196 is open. A bellows 212 allows the movable terminal 206 to move without affecting the vacuum integrity of the chamber 200. The movable terminal 206 is coupled to a drive rod 214 that is coupled to an actuator assembly 216 for opening and closing the vacuum interrupter 196. In this design, the actuator assembly 216 is insulated and not at the line potential. It is noted that the details of the vacuum interrupter 196 are merely for illustrative purposes in that other designs will be applicable. Capacitors 220, representing the capacitor 92, provide for voltage sensing and power line communications (PLC).

For most distributed power sources, the inverter 98 would typically be a grid following inverter, well known to those skilled in the art, where the source 88 requires a voltage reference from the network 10 to operate. As the source 88 provides power for the particular load 86, the voltage on the network 10 provides a voltage reference and allows the load 86 to draw power from the network 10. Therefore, if the load 86 requires additional power to function beyond the distributed power generation, for example, an air conditioner starting, that power is available from the network 10. If power is lost to the network 10 and the voltage reference is also lost, the distributed power generated by the source 88 grid following generation should not be able to generate or export power to the network 10, which would be unknown to the utility, thus possibly creating a safety issue. However, there may be conditions at which an unintentional island can form where distributed generation continues also creating a safety issue.

In order to address this concern, this disclosure proposes a scheme for preventing power from being exported to the network 10 after power is lost to the network 10 for whatever reason if islanding is detected in the network 10. When power is lost and after some predetermined time delay, the switching devices 40 and 76 open to isolate the network 10 from the rest of the grid. This prevents the distributed power source 88 in the network 10 from exporting power back onto the grid outside of the network 10. When the loss of power is restored, the control unit 90 in the transformers 18 and 36 compares the measured voltage and the phase angle at the source side of the transformers 18 and 36 with the measured voltage magnitude and phase angle at the load side of the transformers 18 and 36 and the measured voltage magnitude and phase angle between the switching devices in the transformers 18 and 36 to prevent islanding in the network 10. The voltage magnitude and phase angle are measured for the case where the voltages on the source side and the load side of the transformer are the same, but a power distribution source is exporting unsynchronized power into the network 10 at a different phase angle, where a difference in phase angle as a result of different power sources could create in a fault in the network 10 if the devices 40 or 76 close. If there is an unacceptable difference between voltage magnitudes or the phase angles, then the switching devices 40 and/or 76 are not closed because one or more of the loads serviced by the transformer 18 or 36, or by any of the transformers downstream of the transformers 18 or 36, is injecting power onto the line 16 by a distributed power generation source 88.

It is noted that in this scheme only the source side switching devices in the transformers 18 and 76 are opened when loss of power occurs. Alternately, the source side switching devices of all of the transformers 18-36 can be opened when loss of power is detected, and when power is restored, the voltage measurements are performed and compared as discussed and the switching devices are closed sequentially starting at the transformer 18 or 36 along the line 16.

In addition, a scheme can also be provided to prevent the export of power from a distributed power generation source 88 onto the network 10 during normal operation when the voltage reference point is available, which could otherwise create issues with the utility service. For this embodiment, the transformers 18-36 use measured current and voltage to measure apparent power. For example, if 500 VA of apparent power is injected in the transformer 18 from the source side and 550 VA of apparent power is absorbed from the transformer 18 to the load side, then 50 W of net apparent power is being injected by one or more of the loads 86 being serviced by the transformer 18. Because the power is being measured by, for example, the Rogowski coil 188 and the capacitors 92 and 94, in the switching devices 40 and 42, the control unit 90 can compare the power coming into the transformer 18 on the line 16 at the source side with the power flowing out of the transformer 18 on the line 16 at the load side. If there is more power flowing out of the transformer 18 than what is coming into the transformer 18, then the control unit 90 knows that power is being exported onto the service conductor 84 by a source 88, which may be a violation of the non-export tariff. If this happens, the control unit 90 will open the switching devices 40 and 42 for a short period of time, such as ten 60 Hz cycles or less than 2 seconds, until such time that voltage at the source 88 is lost. When a loss of voltage occurs the grid following inverter 98 at the load 86 having the source 88 will disconnect from the network 10 because it requires a voltage reference from the network 10, and the return to service time, generally 300 seconds, is a requirement for the non-export tariff. Therefore, when the inverter 98 is disconnected from the network 10 for a period of time it no longer has the voltage reference provided by the network 10 and will not be able to produce power during that return to service time. The loads 86 that do not have a source 88 will only see voltage loss for a minimal period of time. Therefore, the load 86 having the source 88 will know that it is in violation of the non-export tariff as the distributed power generation will experience trips during periods of export.

Part of the discussion above refers to preventing islanding, i.e., preventing a load from injecting power onto the network when power is lost or otherwise. However, there may be some situations where the utility wants distributed power to be provided to the loads 86 when power is lost. For example, if an overhead grid is located in an area that is susceptible to wildfires and the overhead grid in those areas needs to be turned off at some point to reduce fire risk, it may be desirous for underground loop circuits that are less susceptible to fire perils than overhead circuits to remain in service using distributed generation. The distributed generation must be sufficient to provide the needed power to some or all of the loads 86 serviced by the underground circuit.

This type of scheme can be accomplished as follows. If power is lost to the network 10, then all of the switching devices 40-78 are opened, where the normally open switching device 58 remains open. When this occurs, all of the sections serviced by the transformers 18-36 are isolated from each other and any load 86 having a power generation source 88 serviced by a transformer 18-36 may be able to provide power for the other loads serviced by that transformer and possibly additional loads serviced by other transformers. For this design, the inverter 98 may be a grid forming inverter, well known to those skilled in the art, instead of a grid following inverter, which is an inverter that generates its own reference voltage, and therefore does not require a reference voltage from the network 10. Alternately, the network 10 can have a single grid forming inverter positioned somewhere along the line 16 that provides the reference voltage, and the power sources 88 would not require grid following inverters.

If a load 86 includes a power generation source 88 and is disconnected from the network 10, its own power generation capability may not be sufficient to power loads such as air conditioners that require a high in-rush current. However, if there are multiple loads 86 that have power generation sources 88, then the power from the combination of these sources 88 may be sufficient to power these devices at any one of the loads 86. Therefore, the control unit 90 at each transformer having open switching devices can control the flow of power among the loads 86 serviced by the transformer if there is sufficient power generation among the loads 86.

If the control unit 90 for the transformer 20 determines that the sources 88 in its section has provided sufficient voltage to support the loads on the conductor 84, it will open its load side switching device 46 so that an adjacent source side switching device detects a return of voltage and will open to provide power to that transformer's section, which may be combined with voltage already being generated in that section from other power generations sources 88. If the control unit 90 controlling a load side switching device detects a large enough voltage sag when the source side switching device of the adjacent transformer opens, then it opens since the sources 88 are insufficient to service additional loads. Depending on the configuration of the network 10 and the amount of power generation that is available, a control unit 90 can also try and power upstream transformer sections in the same manner, but in this case closing its source side switching device. The switching devices will be systematically and relatively slowly closed and voltage detection will occur because the power generation sources 88 will not be able to immediately provide power to many additional loads and will need time to ramp up power. In theory, if there is enough power generation in the network 10 all of the switching devices 42-74 and 78 can eventually be closed to provide power to all of the loads 86 in the network 10, where the switching devices 40 and 76 would remain open to isolate the network 10 from the rest of the grid.

When power is restored to the network 10 and is detected at the upstream side of the switching devices 40 and 76, then a scheme is employed to return the network 10 to its normal mode of operation. The transformers 18 and 36 send PLC signals to notify the other transformers that they should return their power configuration back to normal. After an intentional delay, the control unit 90 in the transformers 18 and 36 compares the measured voltage and the phase angle at the source side of the transformers 18 and 36 with any measured voltage magnitude and phase angle at the load side of the transformers 18 and 36 and the measured voltage magnitude and phase angle between the switching devices in the transformers 18 and 36 in the same manner as discussed above to ensure that the intentional islanding has been shut down, and do not open until all of the voltages and phase angles are synchronized. In other words, the transformers 18-36 go through a voltage measuring and synchronization scheme throughout the network 10. When a section is not synchronized and able to close, the control unit 90 can use a variety of schemes including PLC transfer trips, intentional delays until a synchronization occurs or load side switching devices to synchronize or trip grid forming inverters to eliminate unacceptable differences in voltage or phase angle before the switching devices are closed.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A method for allowing islanding in a power distribution network, the network including a power line, a plurality of transformers electrically coupled to and positioned along the power line, each transformer servicing a section of the network having loads and including a source side switching device and a load side switching device, wherein source power is provided to both ends of the power line and wherein one of the switching devices is a normally open switching device, the method comprising:
    detecting loss of voltage to the network;
    opening the source side and load side switching devices in all of the transformers;
    allowing distributed power generation sources in the sections serviced by the transformers to provide power to the section;
    closing one or both of the source side switching device and the load side switching device of a transformer that services a section that has power generation sources providing excess power; and
    closing a source side switching device or a load side switching device in an adjacent transformer to the transformer section providing excess power to provide power to the adjacent section.

2. The method according to claim 1 further comprising measuring the voltage at the transformer section providing excess power when the adjacent source side or load side switching device is closed and opening the source side switching device or the load side switching device in the transformer of the transformer section if the voltage sags.

3. The method according to claim 2 further comprising closing source side and load side switching devices in other transformers and measuring the voltage in a sequential manner to try and restore power as many transformer sections as possible.

4. The method according to claim 1 wherein allowing distributed power generation sources in the sections serviced by the transformers to provide power to the section includes using a grid forming inverter in power generation sources.

5. The method according to claim 1 wherein allowing distributed power generation sources in the sections serviced by the transformers to provide power to the section includes using a grid forming inverter in the network.

6. The method according to claim 1 further comprising detecting that voltage has returned to the network, and running a scheme to return the network to normal operation that includes providing power line communications (PLC) between the transformers and synchronizing voltage magnitude and phase angles in the network.

7. The method according to claim 6 wherein running a scheme to return the network to normal operation includes using PLC transfer trips to trip grid forming inverters.

8. The method according to claim 1 wherein the source side and load side switching devices in each transformer are controlled by a common control unit.

9. The method according to claim 1 wherein the power distribution network is an underground residential power distribution network.

10. A method for allowing islanding in an underground power distribution network, the network including a power line, a plurality of transformers electrically coupled to and positioned along the power line, each transformer servicing a section of the network having loads and including a source side switching device and a load side switching device, wherein the source side and load side switching devices in each transformer are controlled by a common control unit, source power is provided to both ends of the power line and one of the switching devices is a normally open switching device, the method comprising:
    detecting loss of voltage to the network;
    opening the source side and load side switching devices in all of the transformers;
    allowing distributed power generation sources in the sections serviced by the transformers to provide power to the section;
    closing one or both of the source side switching device and the load side switching device of a transformer that services a section that has power generation sources providing excess power;
    closing a source side switching device or a load side switching device in an adjacent transformer to the transformer section providing excess power to provide power to the adjacent section;

detecting that voltage has returned to the network; and
running a scheme to return the network to normal operation that includes providing power line communications (PLC) between the transformers and synchronizing voltage magnitudes and phase angles in the network.

11. The method according to claim 10 further comprising measuring the voltage at the transformer section providing excess power when the adjacent source side or load side switching device is closed and opening the source side switching device or the load side switching device in the transformer of the transformer section providing excess power if the voltage sags.

12. The method according to claim 11 further comprising closing source side and load side switching devices in other transformers and measuring the voltage in a sequential manner to try and power as many transformer sections as possible.

13. The method according to claim 10 wherein allowing distributed power generation sources in the sections serviced by the transformers to provide power to the section includes using a grid forming inverter in each power generation source.

14. The method according to claim 10 wherein allowing distributed power generation sources in the sections serviced by the transformers to provide power to the section includes using a grid forming inverter in the network.

15. The method according to claim 10 wherein running a scheme to return the network to normal operation includes using PLC transfer trips to trip grid forming inverters.

16. A system for allowing islanding in a power distribution network, the network including a power line, a plurality of transformers electrically coupled to and positioned along the power line, each transformer servicing a section of the network having loads and including a source side switching device and a load side switching device, wherein source power is provided to both ends of the power line and wherein one of the switching devices is a normally open switching device, the system comprising:
  means for detecting loss of voltage to the network;
  means for opening the source side and load side switching devices in all of the transformers;
  means for allowing distributed power generation sources in the sections serviced by the transformers to provide power to the section;
  means for closing one or both of the source side switching device and the load side switching device of a transformer that services a section that has power generation sources providing excess power; and
  means for closing a source side switching device or a load side switching device in an adjacent transformer to the transformer section providing excess power to provide power to the adjacent section.

17. The system according to claim 16 further comprising means for measuring the voltage at the transformer section providing excess power when the adjacent source side or load side switching device is closed and opening the source side switching device or the load side switching device in the transformer of the transformer section if the voltage sags.

18. The system according to claim 17 further comprising means for closing source side and load side switching devices in other transformers and measuring the voltage in a sequential manner to try and restore power as many transformer sections as possible.

19. The system according to claim 16 wherein the means for allowing distributed power generation sources in the sections serviced by the transformers to provide power to the section uses a grid forming inverter in power generation sources.

20. The system according to claim 16 wherein the means for allowing distributed power generation sources in the sections serviced by the transformers to provide power to the section uses a grid forming inverter in the network.

* * * * *